US009340136B2

(12) United States Patent
Masanek, Jr.

(10) Patent No.: US 9,340,136 B2
(45) Date of Patent: May 17, 2016

(54) TWO-PIECE VEHICLE FLOOR COVER RETENTION DEVICE

(71) Applicant: MacNeil IP LLC, Bolingbrook, IL (US)

(72) Inventor: Frederick W. Masanek, Jr., Barrington, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 14/479,438

(22) Filed: Sep. 8, 2014

(65) Prior Publication Data
US 2014/0377502 A1 Dec. 25, 2014

Related U.S. Application Data

(62) Division of application No. 13/457,625, filed on Apr. 27, 2012, now Pat. No. 8,991,006.

(51) Int. Cl.
*B32B 3/24* (2006.01)
*B60N 3/04* (2006.01)
*F16B 1/00* (2006.01)
*F16B 2/20* (2006.01)
*F16B 5/06* (2006.01)
*F16B 21/09* (2006.01)
*F16B 21/20* (2006.01)

(52) U.S. Cl.
CPC ............. *B60N 3/046* (2013.01); *B60N 3/044* (2013.01); *B60N 3/048* (2013.01); *F16B 2/20* (2013.01); *F16B 5/0692* (2013.01); *Y10T 16/10* (2015.01); *Y10T 16/1867* (2015.01); *Y10T 24/44026* (2015.01); *Y10T 24/44034* (2015.01); *Y10T 24/4599* (2015.01); *Y10T 24/45984* (2015.01); *Y10T 403/648* (2015.01); *Y10T 428/13* (2015.01); *Y10T 428/2457* (2015.01); *Y10T 428/24174* (2015.01); *Y10T 428/24182* (2015.01); *Y10T 428/24273* (2015.01); *Y10T 428/24289* (2015.01); *Y10T 428/24298* (2015.01); *Y10T 428/24322* (2015.01); *Y10T 428/24479* (2015.01); *Y10T 428/24587* (2015.01); *Y10T 428/24661* (2015.01); *Y10T 428/24669* (2015.01)

(58) Field of Classification Search
CPC ............................ B60N 3/046; A47G 27/0418
See application file for complete search history.

(56) References Cited

U.S. PATENT DOCUMENTS

| 772,634 A | 10/1904 | Snyder |
| 1,647,781 A | 11/1927 | Carr |
| 1,732,203 A | 10/1929 | Kimbell |

(Continued)

FOREIGN PATENT DOCUMENTS

| CA | 2420510 A1 | 2/2003 |
| DE | 364426 A | 11/1922 |

(Continued)

OTHER PUBLICATIONS

European Patent Office, Extended European Search Report issued on Jun. 16, 2014 on European Patent Application No. 14162359.5.

*Primary Examiner* — Jeff Vonch
(74) *Attorney, Agent, or Firm* — Perkins IP Law Group LLC; Jefferson Perkins

(57) ABSTRACT

In a grommet for a vehicle floor cover, receptacles formed in a generally cylindrical inner surface of a female tubular body making up part of one grommet portion receive protrusions formed on a generally cylindrical outer surface of a male tubular body making up part of a second grommet portion.

12 Claims, 9 Drawing Sheets

(56) References Cited

U.S. PATENT DOCUMENTS

| | | |
|---|---|---|
| 1,896,873 A | 2/1933 | Upham |
| 2,015,049 A | 9/1935 | Carr |
| 2,042,866 A | 6/1936 | Simons |
| 2,131,347 A | 9/1938 | Fenton |
| 2,212,361 A | 8/1940 | Arthur |
| 2,242,352 A | 5/1941 | Fenton |
| 2,256,850 A | 9/1941 | Purinton |
| 2,385,774 A | 10/1945 | Clarke |
| 2,519,316 A | 8/1950 | Jones |
| 2,668,340 A | 2/1954 | Jones |
| 2,683,908 A | 7/1954 | Carpinella |
| 2,724,162 A | 11/1955 | Fenton |
| 2,724,884 A | 11/1955 | Jones |
| 2,745,160 A | 5/1956 | Jones |
| 2,771,653 A | 11/1956 | Carpinella |
| 2,799,910 A | 7/1957 | Weber |
| 3,010,169 A | 11/1961 | Carpinella |
| 3,031,730 A | 5/1962 | Morin |
| 3,091,795 A | 6/1963 | Budwig |
| 3,135,820 A | 6/1964 | Hallett, Jr. et al. |
| 3,613,181 A | 10/1971 | Taylor |
| 3,715,075 A | 2/1973 | Blau et al. |
| 3,851,357 A | 12/1974 | Ribich et al. |
| 3,895,797 A | 7/1975 | Moore |
| 3,914,144 A | 10/1975 | Ribich et al. |
| 3,916,703 A | 11/1975 | Ribich et al. |
| 4,212,051 A | 7/1980 | Kulik |
| 4,392,279 A | 7/1983 | Schwager |
| 4,403,895 A | 9/1983 | Caldwell et al. |
| 4,406,033 A | 9/1983 | Chisholm et al. |
| 4,430,777 A | 2/1984 | Takeda |
| 4,531,733 A | 7/1985 | Hall |
| 4,561,146 A | 12/1985 | Schaty |
| 4,562,624 A | 1/1986 | Kanzaka |
| 4,833,760 A | 5/1989 | Sundstrom |
| 4,834,573 A | 5/1989 | Asano et al. |
| 4,878,792 A | 11/1989 | Frano |
| 4,883,331 A | 11/1989 | Mengel |
| 4,893,978 A | 1/1990 | Frano |
| 4,981,405 A | 1/1991 | Kato |
| 5,003,664 A | 4/1991 | Wong |
| 5,011,356 A | 4/1991 | Fernandez |
| 5,014,400 A | 5/1991 | Ban |
| 5,048,160 A | 9/1991 | Goodrich et al. |
| 5,058,245 A | 10/1991 | Saito |
| 5,069,586 A | 12/1991 | Casey |
| 5,134,757 A | 8/1992 | Johnson |
| 5,170,985 A | 12/1992 | Killworth et al. |
| 5,195,857 A | 3/1993 | Hiramoto |
| 5,282,616 A | 2/1994 | Stacavich-Notaro |
| 5,308,671 A | 5/1994 | Wells |
| 5,335,893 A | 8/1994 | Opp |
| 5,362,187 A | 11/1994 | Scalise |
| 5,364,150 A | 11/1994 | Cochran et al. |
| 5,368,427 A | 11/1994 | Pfaffinger |
| 5,384,939 A | 1/1995 | Weber |
| 5,390,397 A | 2/1995 | Kremer et al. |
| 5,509,182 A | 4/1996 | Nakanishi |
| 5,511,283 A | 4/1996 | Hirose |
| 5,511,919 A | 4/1996 | Scalise |
| 5,537,793 A | 7/1996 | Murasaki |
| 5,566,430 A | 10/1996 | Cheng |
| 5,586,832 A | 12/1996 | Zylka |
| 5,647,107 A | 7/1997 | Brewster |
| D390,099 S | 2/1998 | Bailey et al. |
| D392,877 S | 3/1998 | Eguchi |
| 5,772,380 A | 6/1998 | Cloud et al. |
| D396,406 S | 7/1998 | Eguchi |
| 5,775,859 A | 7/1998 | Anscher |
| 6,345,946 B1 | 2/2002 | Mainini et al. |
| 6,357,090 B1 | 3/2002 | Murai |
| 6,381,806 B1 | 5/2002 | Stanesic et al. |
| 6,431,585 B1 | 8/2002 | Rickabus et al. |
| 6,497,003 B2 | 12/2002 | Calabrese |
| 6,568,893 B2 | 5/2003 | LeVey et al. |
| 6,595,155 B1 | 7/2003 | Akers |
| 6,612,795 B2 | 9/2003 | Kirchen |
| 6,735,819 B2 | 5/2004 | Iverson et al. |
| 6,757,945 B2 | 7/2004 | Shibuya et al. |
| 7,131,806 B2 | 11/2006 | Hansen |
| 7,546,661 B2 | 6/2009 | Connor, Jr. |
| 7,945,992 B2 | 5/2011 | Parisi et al. |
| 8,122,567 B2 | 2/2012 | Connor, Jr. |
| 8,757,698 B1 | 6/2014 | Rowland |
| 2007/0011844 A1 | 1/2007 | Aoki et al. |
| 2009/0155015 A1 | 6/2009 | Parisi et al. |
| 2009/0235485 A1 | 9/2009 | Connor, Jr. |
| 2009/0269546 A9 | 10/2009 | Alford |
| 2010/0122429 A1 | 5/2010 | Gonzalez et al. |

FOREIGN PATENT DOCUMENTS

| | | | |
|---|---|---|---|
| DE | 1952826 U | 1/1967 | |
| DE | 3142761 A1 | 9/1982 | |
| DE | 8320276.5 U1 | 12/1983 | |
| DE | 3238121 A | 4/1984 | |
| DE | 3238121 A1 | 4/1984 | |
| DE | 3240270 A1 | 5/1984 | |
| DE | 3427641 A1 | 1/1986 | |
| DE | 3632618 A1 | 4/1988 | |
| DE | 8717754.4 U1 | 2/1990 | |
| DE | 9115861 U1 * | 3/1992 | ............. B60N 3/046 |
| DE | 9115861.3 U1 | 4/1992 | |
| DE | 9300657 U1 * | 3/1993 | ............. B60N 3/046 |
| DE | 9300657.8 U1 | 4/1993 | |
| DE | 4204410 A1 | 8/1993 | |
| DE | 4218213 C1 | 2/1994 | |
| DE | 4218213 C1 | 10/1994 | |
| DE | 19805949 A1 | 8/1999 | |
| DE | 20001405 U1 | 5/2000 | |
| DE | 10059322 A1 | 7/2001 | |
| DE | 19617408 C2 | 2/2003 | |
| DE | 19655255 B4 | 4/2013 | |
| EP | 0211966 A1 | 3/1987 | |
| EP | 0311736 A1 | 4/1989 | |
| EP | 0561055 A2 | 9/1993 | |
| EP | 1232070 B1 | 1/2005 | |
| EP | 1980444 A2 | 10/2008 | |
| FR | 1405310 A | 7/1965 | |
| FR | 1493333 A | 8/1967 | |
| FR | 92613 A | 12/1968 | |
| GB | 542153 A | 12/1941 | |
| GB | 936095 A | 9/1963 | |
| GB | 1073408 A | 6/1967 | |
| GB | 1236407 A | 6/1971 | |
| GB | 2087229 A | 5/1982 | |
| JP | 6388178 U | 6/1988 | |
| JP | 1317838 A | 12/1989 | |
| JP | 1988-88178 A | 6/1991 | |
| JP | 733737 U | 6/1995 | |
| JP | 2000-95010 A1 | 4/2000 | |
| JP | 2000095010 A | 4/2000 | |
| WO | 0136227 A2 | 5/2001 | |
| WO | 2012039058 A1 | 3/2012 | |
| WO | WO 2012095823 A1 * | 7/2012 | ............. B60N 3/046 |

\* cited by examiner

TWO-PIECE VEHICLE FLOOR COVER RETENTION DEVICE

RELATED APPLICATIONS

This application is a division of copending U.S. patent application Ser. No. 13/457,625 owned by the common assignee hereof. The specification and drawings of U.S. patent application Ser. No. 13/457,625 are fully incorporated by reference herein.

BACKGROUND OF THE INVENTION

Vehicle floor covers, such as floor mats or floor trays, are commonly available to protect the underlying vehicle carpeting and to facilitate removal of dirt or debris from the foot wells of the vehicle. Due to the danger of interference with the gas and brake pedals, at least that floor cover provided for the driver's side must be secured in place within the driver's side foot well. Many vehicle manufacturers secure their floor covers by employing vertical studs, which are affixed to the foot well, in combination with holes or grommets in the floor covers. Some of these studs have an oblong rotatable locking member which is affixed to an upstanding post. Once the hole or grommet of the floor cover is placed over the vertical stud, the oblong rotatable member is turned to prevent the stud from being removed from the hole or grommet. It is important to correctly orient the stud-receiving orifice in any hole-cladding grommet with the position that the rotatable member takes prior to turning it to secure the floor cover to the foot well floor. Many grommets have two pieces and are assembled to the floor cover hole with the floor cover sandwiched between them. Time-wasting errors can be committed in attempting to assemble the top grommet portion to the bottom grommet portion the wrong way.

By their nature, vehicle floor mats and trays are meant to be installed and removed, often by a consumer. Sometimes a consumer will incorrectly install a mat or tray, sometimes upside down.

SUMMARY OF THE INVENTION

In one embodiment, a vehicle floor cover (such as a vehicle floor mat or tray) has an upper surface, a lower surface, and a hole formed from the lower surface to the upper surface around the axis. A grommet, which may be provided separately, is provided to clad this hole and has bottom and top grommet portions. The bottom grommet portion has a bottom tubular body formed around an axis. The bottom tubular body has a bottom floor cover retention flange extending radially outwardly from its outer surface. At least a portion of the bottom tubular body upwardly extends from the bottom floor cover retention flange.

A top grommet portion has a top tubular body formed around the axis. The top tubular body has a top floor cover retention flange which extends radially outwardly from its outer surface. At least a portion of the top tubular body downwardly extends from the top floor cover retention flange.

One of the top and bottom tubular bodies is female and the other of the top and bottom tubular bodies is male, such that the male tubular body fits inside of the female tubular body. At least one receptacle is formed in the generally circularly cylindrical inner surface of the female tubular body to extend radially outwardly therefrom. This receptacle is disposed adjacent to an upper axial end of the female tubular body and axially extends therefrom by a depth which is less than the length of the inner surface of the female tubular body.

A generally cylindrical outer surface of the male tubular body has at least one protrusion which radially outwardly extends therefrom, and is adapted to be received in the receptacle formed in the female tubular body. This prevents rotation of the male tubular body relative to the female tubular body around the axis. The limited depth of the receptacle prevents the assembly of the male tubular body to the female tubular body in an upside down condition, such as top-to-top or bottom-to-bottom; it will only allow bottom-to-top assembly.

In one embodiment fasteners, such as latches, are formed on the top and bottom grommet portions respectively to fasten to each other, such as by a snap fit, once the male tubular body is received by the female tubular body.

In one embodiment the vehicle floor cover hole is noncircular in that it has a plurality of grooves radially outwardly extending from a generally circularly cylindrical sidewall of the hole. The outer surface of the female tubular body includes radially outwardly extending protrusions which are each adapted to be received in respective ones of the grooves. The interacting noncircular orienting grooves, protrusions and receptacles insure that the grommet as installed will have the correct angular disposition relative to axis of the retention stud that the grommeted hole is adapted to receive. The floor cover then will be fastened in place in the vehicle foot well in the correct location and disposition.

In another aspect, a grommet for use in cladding one of a plurality of stud retention holes made in respective vehicle foot well covers having different thicknesses comprises a top grommet portion and a bottom grommet portion. The top grommet portion has a top tubular body that is formed around an axis and has an outer surface. A top floor cover retention flange extends radially outwardly from the outer surface of the top tubular body. The bottom grommet portion has a bottom tubular body that is formed around the axis and has an outer surface and a bottom floor cover retention flange that extends radially outwardly from the outer surface of the bottom tubular body.

A preselected one of the top and bottom tubular bodies is a female tubular body and the other of the top and bottom tubular bodies is a male tubular body adapted to be received inside of the female tubular body. A plurality of angularly spaced-apart chamfered gussets are each formed to join the outer surface of the female tubular body to the floor cover retention flange associated with that tubular body. A right cross sectional area of each gusset increases as a function of its axial proximity to the floor cover retention flange. In one embodiment the floor cover retention flange to which the gussets are joined is the bottom floor cover retention flange. When the grommet is used to clad or jacket a hole made in a relatively thick floor cover, the gussets will bite into the floor cover. When the grommet is used instead to clad or jacket a hole in a relatively thin floor cover, the gussets will act to prop the thickness of the floor cover against the top floor cover retention flange, so that there will be no gap between the upper surface of the floor cover and the lower surface of the top floor cover retention flange.

In another aspect, a floor cover retention system includes a plurality of studs formed to stand up from the vehicle foot well floor, and a matching plurality of grommet-clad holes in a mat or tray for receiving respective ones of the studs. Among these studs are a first stud, which can be near an aft and outboard corner of the floor cover, and a second stud, which can be near an aft and inboard corner of the floor cover. The first stud, a first floor cover hole and a first grommet are all disposed on a first axis. The second stud, a second floor cover hole and a second grommet are all disposed on a second axis.

The first grommet defines a first stud hole for receiving the first stud, while the second grommet defines a second stud hole for receiving the second stud. The first stud is noncircular in right cross section and the first stud hole is likewise. The second stud is noncircular in right cross section and the second stud hole is likewise. The first and second studs, and the first and second stud holes, are intentionally oriented differently from each other, such that the first stud is not a mirror image of the second stud about an imaginary longitudinal center line drawn between the studs. The stud holes and studs are so selected that in the case of at least one of the studs, the stud can be received in one of the stud holes but not the other. This militates against a consumer attempting to install a mat or tray upside down. Preferably both stud holes are mutually exclusive: it will accept the stud for which it was intended, but not the other one.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
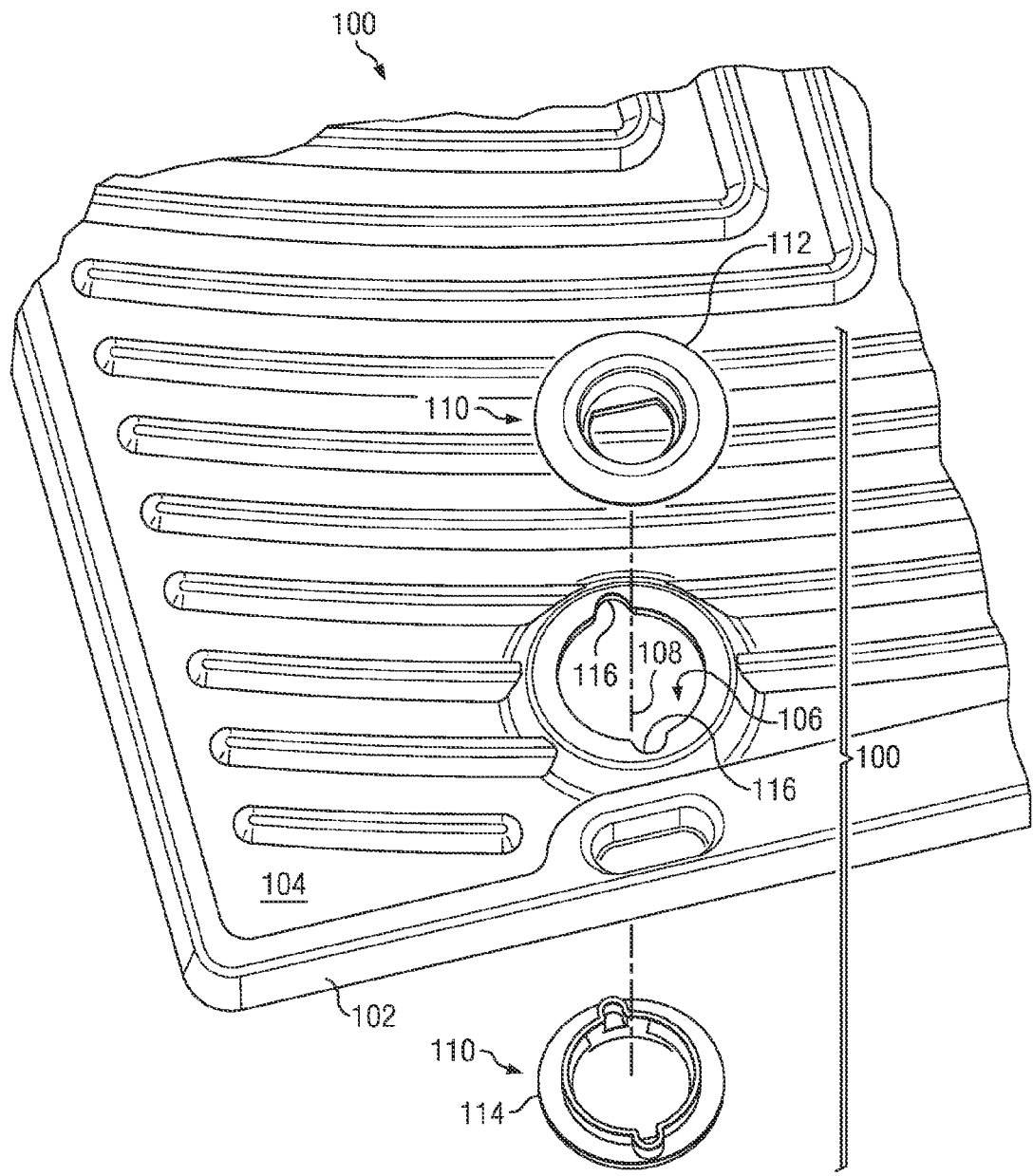
FIG. 1 is an isometric exploded view showing a portion of a vehicle floor cover, a top grommet portion, and a bottom grommet portion.

As described briefly above, aspects of the present invention include grommets for cladding stud retention holes formed in vehicle floor covers, floor covers with these grommets installed, and systems including such vehicle floor covers and vehicle foot wells provided with retention studs to fasten them in place. FIG. 1 shows a floor cover retention system, indicated generally at 100, having a vehicle floor cover 102 (such as a mat or tray) with an upper surface 104, a lower surface 300 (see FIG. 3), and at least one floor cover stud retention hole 106 formed in the floor cover 102 between the upper and lower surfaces 104, 300. The floor cover stud retention hole 106 is formed around a vertical axis 108. Often there are two laterally spaced-apart studs and floor cover retention holes, typically located near the aft outboard and aft inboard corners of the foot well and floor cover, but only a representative one of them is shown in FIGS. 1-8B. Two such studs and holes can be seen in FIG. 9.

The floor cover retention hole 106 is clad with a grommet 110 which includes an upper grommet portion 112 and a lower grommet portion 114. The upper grommet portion 112 and lower grommet portion 114 are assembled to sandwich the vehicle floor cover 102 between them. The stud retention hole 106 can be generally circularly cylindrical, as shown, and preferably is provided with one or more outwardly laterally radially extending grooves 116 which can be used to angularly orient the grommet 110 to the floor cover. In the illustrated embodiment there are two such grooves 116, angularly spaced apart from each other by 180 degrees.

Figure 2:
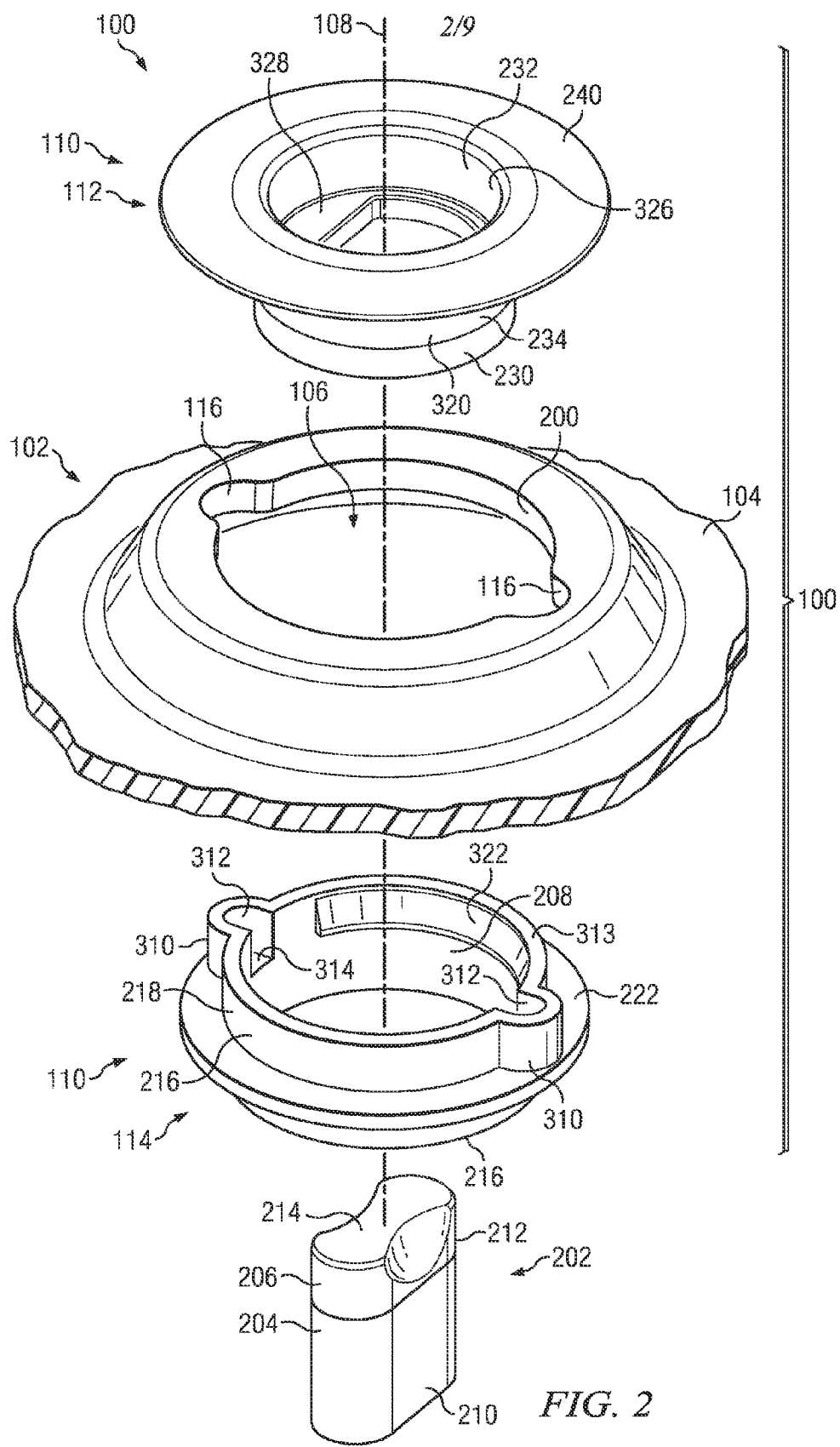
FIG. 2 is an exploded and detailed top isometric view showing a portion of a vehicle floor cover, a top grommet portion, a bottom grommet portion and a vehicle foot well retention stud receivable into the grommet.
Figure 3:
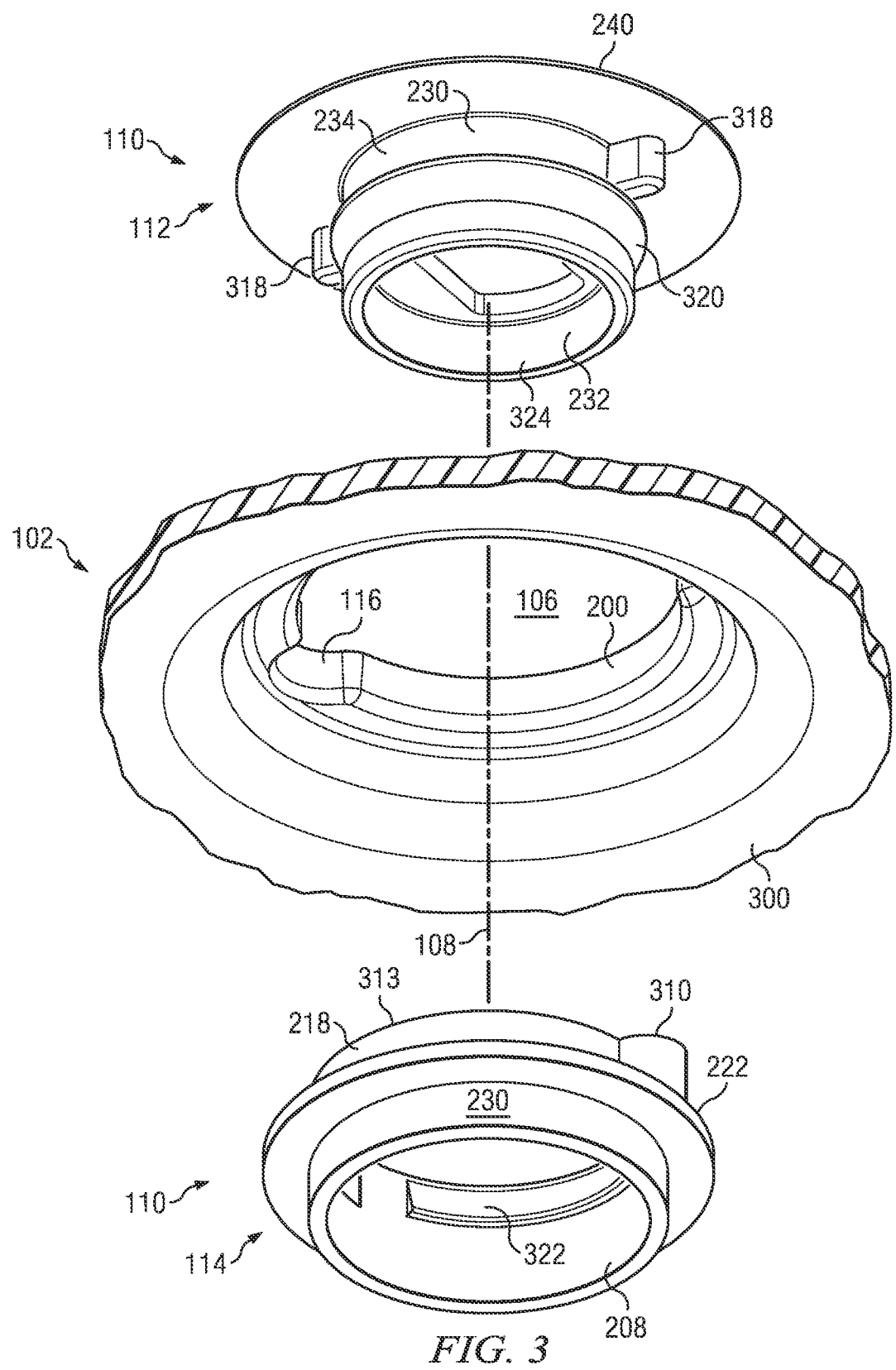
FIG. 3 is an exploded bottom isometric view showing the floor cover and the grommet portions of FIG. 2.

As shown in FIGS. 2 and 3, the floor cover stud retention hole 106 has a generally circularly cylindrical sidewall 200 in which the noncircular orienting shapes or grooves 116 are formed. As will become apparent below, the grooves 116 combine with top and bottom grommet portions 112, 114 to ensure that one or more of the top and lower grommet portions 112, 114 are properly oriented within the floor cover stud retention hole 106.

The noncircular orienting shape or shapes 116 may take a variety of forms. Instead of radially outwardly projecting grooves as shown, the shape or shapes can comprise a hole margin which is more generally noncircular, e.g. an ellipse, it can have one or more protrusions, e.g. a star, or it can have one or more indentations around the perimeter of the hole 106. Alternatively stated, the noncircular orienting shape(s) 116 of the hole 106 can take any shape other than a circle centered on axis 108.

The top and bottom grommet portions 112, 114 cooperate with a vehicle foot well retaining stud 202 (see FIGS. 2 and 4) to secure the floor cover 102 in a fixed position (to the foot well, not shown) and to prevent its movement. The retaining stud 202 is typically integrated into the foot well (not shown) by the vehicle manufacturer, but this is not necessarily so.

Figure 4:
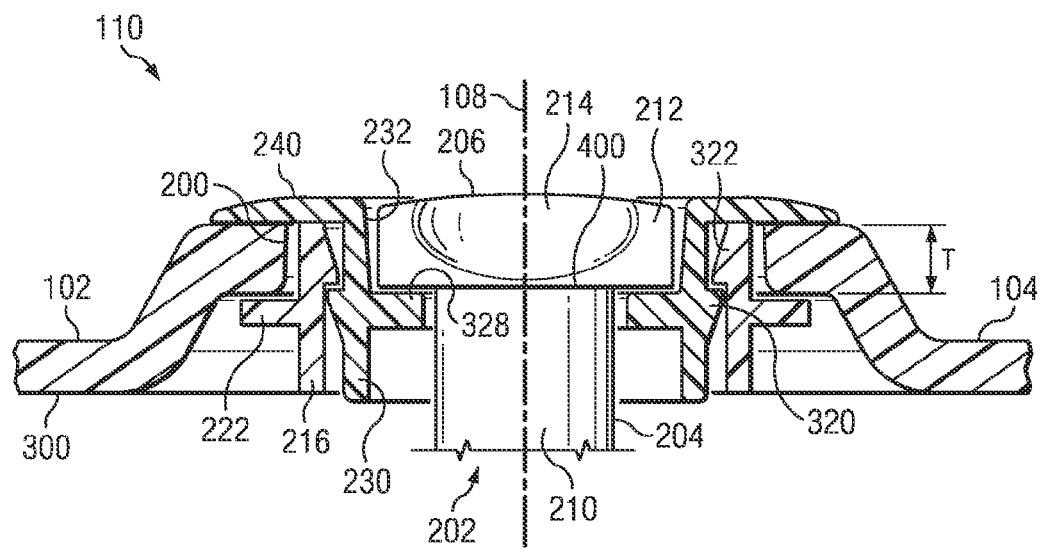
FIG. 4 is a side sectional view of the embodiment shown in FIG. 1, shown in an assembled condition.

Referring to FIGS. 2 and 4 and in one embodiment, the retaining stud 202 has an upstanding post 204 and a locking member 206 that is rotatably affixed to the top of the upstanding post 204. The stud 202 is formed around the axis 108, and the rotatable member 206 can be rotated by the user around the axis 108 between a first, unlocked position and a second, locked position. Typically, the rotatable member 206 is affixed to an upper end 400 of the stud 202 and turns between a first position and a second position (which is typically offset from the first position by 90°) on the upstanding post 204. A cross section of a vertical sidewall surface 212 of the rotating member 206 preferably does not conform to a circle centered on the axis 108, such that when the rotating member 206 cooperates with the top or bottom grommet portions 112, 114 of the grommet 110, a land 328 of the upper grommet portion 112 allows the insertion of the stud 202 through the top and bottom grommet portions 112, 114 when the rotating member 206 is in the first position, and prevents removal when in the second position.

In this embodiment, a vertical stud surface 210 is mathematically cylindrical or prismatic in that its cross section does not vary along the axis 108. At its junction with the vertical stud surface 210, the vertical side wall 212 of the rotating member 206 conforms to, and preferably is continuous with, the cylinder of the vertical stud surface 210 when in the first position and doesn't conform to this cylinder when member 206 has been rotated to the second position. The retaining stud 202 may have a shape that is radially asymmetrical, such as a rectangle or an oval, and preferably includes the rotatable member 206 described above, but the stud 202 may also take other forms that do not have rotating fasteners, e.g. hooks. The rotating member 206 may have an upper portion 214 that has been scalloped for better manipulation by fingers.

The bottom grommet portion 114 has a bottom tubular body 216 formed around the axis 108. In the illustrated embodiment the bottom tubular body 216 has a generally circularly cylindrical inner surface 208 and a generally circularly cylindrical outer surface 218. A bottom floor cover retention flange 222 extends radially outwardly from the outer surface 218 of the bottom tubular body 216 so that the bottom floor cover retention flange 222 is at an angle (such as a right angle) to the axis 108. In the illustrated embodiment at least a portion of the bottom tubular body 216 extends upwardly from the bottom floor cover retention flange 222.

The top grommet portion 112 has a top tubular body 230 formed around the axis 108. The top tubular body 230 has a generally circularly cylindrical inner surface 232 and a generally circularly cylindrical outer surface 234. A top floor cover retention flange 240 extends radially outwardly from the outer surface 234 of the top tubular body 230 such that it is at an angle to the axis 108. At least a portion of the top tubular body 230 extends downwardly from the top floor cover retention flange 240. Preferably, the top floor cover retention flange 240 is perpendicular to the axis 108 and outer surface 234, and the flanges 222, 240 may extend entirely or partially around the circumference of the respective tubular bodies 216, 230.

A preselected one of the bottom and top tubular bodies 216, 230 is female and the other is male. At least one, and in this embodiment two, outer noncircular orienting features 310 are formed on the outer surface 218 of the female tubular body to be angularly spaced apart from each other and to register with the corresponding noncircular orienting shape(s) or groove(s) 116 of the hole 106 so as to prevent rotation of the female tubular body relative to the floor cover 102 around the axis 108. The generally circularly cylindrical inner surface 208 of the female tubular body has at least one, and in this embodiment two, angularly spaced-apart inner noncircular orienting features 312. Inner orienting features 312 conveniently may be formed at the same angular place as, or in angular alignment with, outer orienting features 310, and as inverses of the outer features or protrusions 310, and with a substantially uniform thickness between them, but alternatively the inner features 312 may be angularly displaced from the outer features 310 and may take an entirely different shape.

In the illustrated embodiment each orienting feature 312 is a radially outwardly extending receptacle having a floor 314; it is "blind" in that the receptacle 312 intentionally does not extend through the entire depth of the female tubular body. Each receptacle 312 is adjacent to an upper axial end or margin 313 of the female tubular body. If more than one receptacle 312 is provided, they should be angularly spaced apart from each other. The receptacle floors 314 limit the travel of the upper grommet portion relative to the lower one such that the plastic or rubber vehicle floor mat or tray 102 is not overcompressed. The floors 314 will permit a small amount of overdrive of one fastening wedge 320 past the other fastening wedge 322 (see FIG. 6), so as to permit the female and male tubular bodies to snap together. The limited depth of the receptacles 312 makes it impossible for top portion 112 to be assembled to bottom portion 114 in any but a bottom-to-top orientation; an assembler will not succeed in joining the grommet halves upside down.

An inner surface 232 of the male tubular body is sized to receive the rotatable member 206 and the post 204, and a generally circularly cylindrical outer surface 234 of the male tubular body has at least one, and in this embodiment two, noncircular orienting elements or protrusions 318 for registration with the inner noncircular orienting feature(s) or receptacles 312 of the female tubular body, so as to prevent rotation of the male tubular body 230 relative to the female tubular body 216 around the axis 108. Elements or protrusions 318 extend radially outwardly from the generally circularly cylindrical outer surface 234 and in this embodiment adjacent to a lower surface of the retention flange 240. The protrusions 318 do not extend for the length of the tubular body 216.

One or more fasteners or latches 320, 322 are formed on the top and bottom grommet portions 112, 114 to fasten the portions 112, 114 to each other once the male tubular body is received into the female tubular body, forming a snap or interference fit. In this embodiment, fasteners or latches 320, 322 are in the form of opposed wedges (because they are curved around axis 108, they are really frustoconical sections) and will snap past each other when the grommet halves are installed to clad a floor cover hole. Wedge 320 has a thickness which decreases as a function of axial depth (down in FIGS. 2 and 3). Wedge 322 has a thickness which increases as a function of axial depth.

FIGS. 1-6 show the bottom tubular body 216 as being female, but the reverse configuration can also be used with slight modifications to the structure of the top grommet portion 112 and bottom grommet portion 114. See FIGS. 7A-B and 8A-B, discussed below.

The inner surface 232 of the male tubular body preferably has a lower portion 324, an upper portion 326, and at least one land 328 between the lower and upper portions 324, 326. The land 328 extends radially inwardly from the inner surface 232. The lower portion 324 of the male tubular body and the land 328 permit the insertion therethrough of the stud 202 when the rotating member 206 is in the first position, and the land 328 prevents the withdrawal of the stud 202 once the rotating member 206 is rotated to the second position.

As described previously and as shown in FIG. 2, a vertical surface 210 of the post 204 is formed to be mathematically cylindrical relative to the axis 108 but with a noncircular cross section relative to the axis 108. The vertical side wall 212 of the rotating member 206 may be formed to be cylindrical relative to the axis 108 but also have a noncircular cross section relative to the axis 108. The rotating member 206 can be in cylindrical alignment with the vertical surface 210 of the post 204 when in the first position. The rotating member 206 is not in cylindrical alignment with the vertical surface 210 of the post 204 when in the second position.

FIGS. 1-3 also show that the sidewall 200 of the hole of the floor cover 102 is generally circularly cylindrical. The one or more noncylindrical orienting shapes 116 of the cover hole 106 may be one of a plurality of grooves, or shaped cut-outs 116, such as, semicircles, triangles, etc., that extend radially outwardly from the rest of the sidewall 200 of the hole 106. The outer noncircular orienting feature(s) 310 each may be one of a plurality of radially outwardly extending protrusions that register with the grooves or cut-outs. The noncircular orienting element(s) 318 of the top grommet portion 112 may be a vertical fin, or "ear," or a bump, which extends radially outwardly from the otherwise circularly cylindrical outside surface 234 of the male tubular body and engages with the noncircular orienting shape of feature 312.

As discussed briefly above, the orienting shape(s) 116 may be formed into the entire floor cover hole 106, so that the floor cover hole 106 permits assembly with the top and/or bottom grommet portions 112, 114 only when the grommet portions 112, 114 are oriented in a specific direction in relation to the floor cover 102. For example, the floor cover hole 106 may be an oval, triangle, rectangle, or other shape that does not permit rotation of the grommet relative to it around the axis 108.

As shown in FIG. 2, the noncircular orienting shape(s) 116 of the floor cover 102, each of the inner noncircular orienting feature(s) 312, the outer noncircular orienting feature(s) 310, and the noncircular orienting element(s) 318 compliments its mating orienting structure. When assembled, these orienting structures combine to orient the top and the bottom grommet portions 112, 114 within the floor cover hole 106 in a predetermined direction and to prevent rotation of the grommet 110 relative to the floor cover 102 about the axis 108.

FIGS. 7A-B and 8A-B show that the top grommet portion 702 may be female, the bottom grommet portion 704 may be male, and the stud-retaining land 328 may be formed into the bottom grommet portion 704. At least one (and in the illustrated embodiment, two) noncircular orienting features 706 are formed on a generally circularly cylindrical outer surface 708 of the female tubular body 710 (here shown to be the top grommet portion 702) to register with the corresponding noncircular orienting shape(s) 116 of the hole 106. As above, the combination of the orienting feature(s) 706 and the orienting shape(s) 116 prevents rotation of the female tubular body relative to the floor cover 102 around the axis 108. A top floor cover retention flange 240 extends radially outwardly from the outer surface 708 of the top tubular body 710.

The bottom grommet portion 704 has a bottom tubular body 712, and a generally circularly cylindrical outer surface 714 thereof has at least one, and in the illustrated embodiment two, noncircular orienting elements or protrusions 716, which register with respective inner noncircular orienting features or receptacles 718 of the female tubular body.

Figure 6:
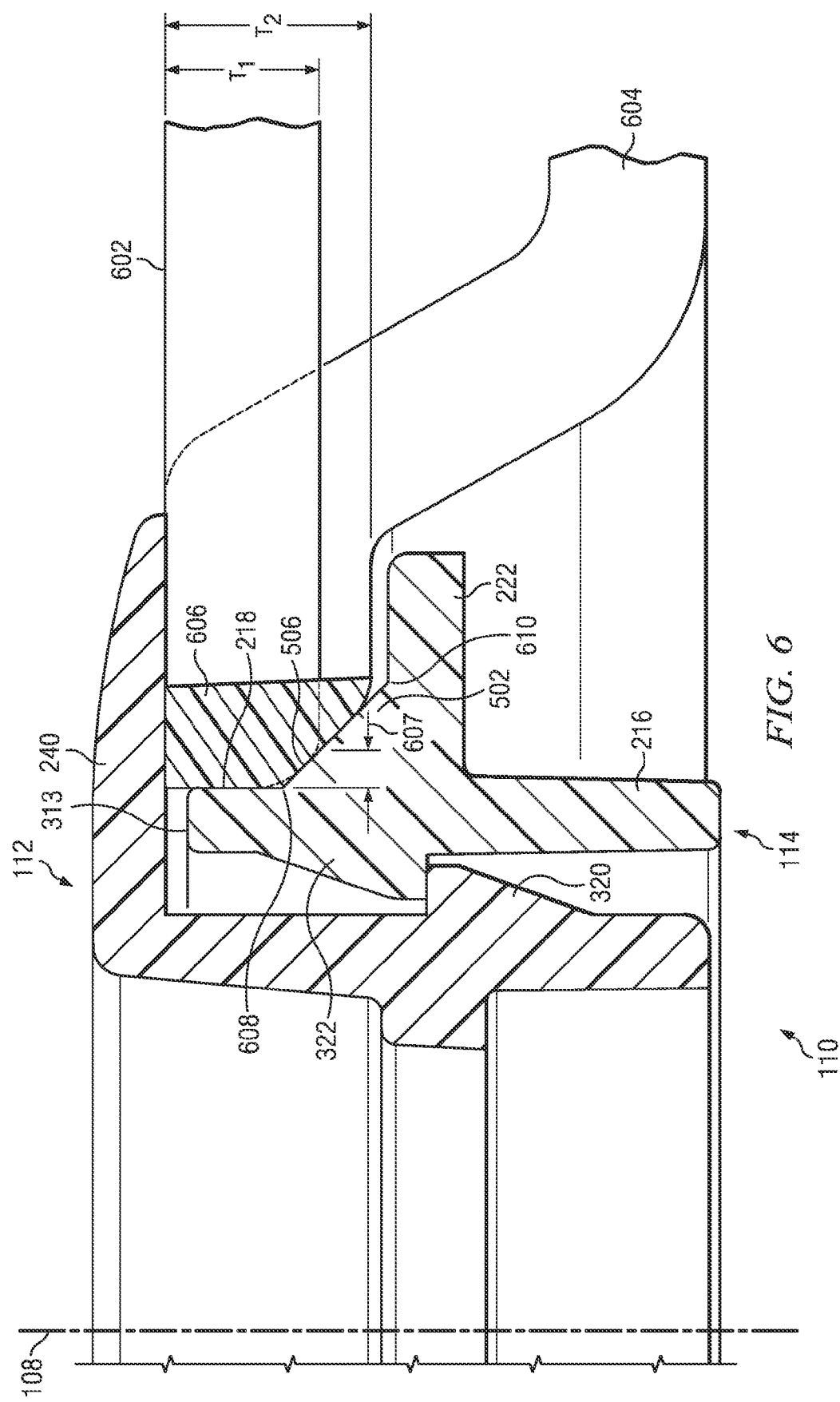
FIG. 6 is a magnified side sectional view showing the grommet of FIG. 5 in an assembled condition, and as cladding floor covers of different thicknesses.
Figure 7A:
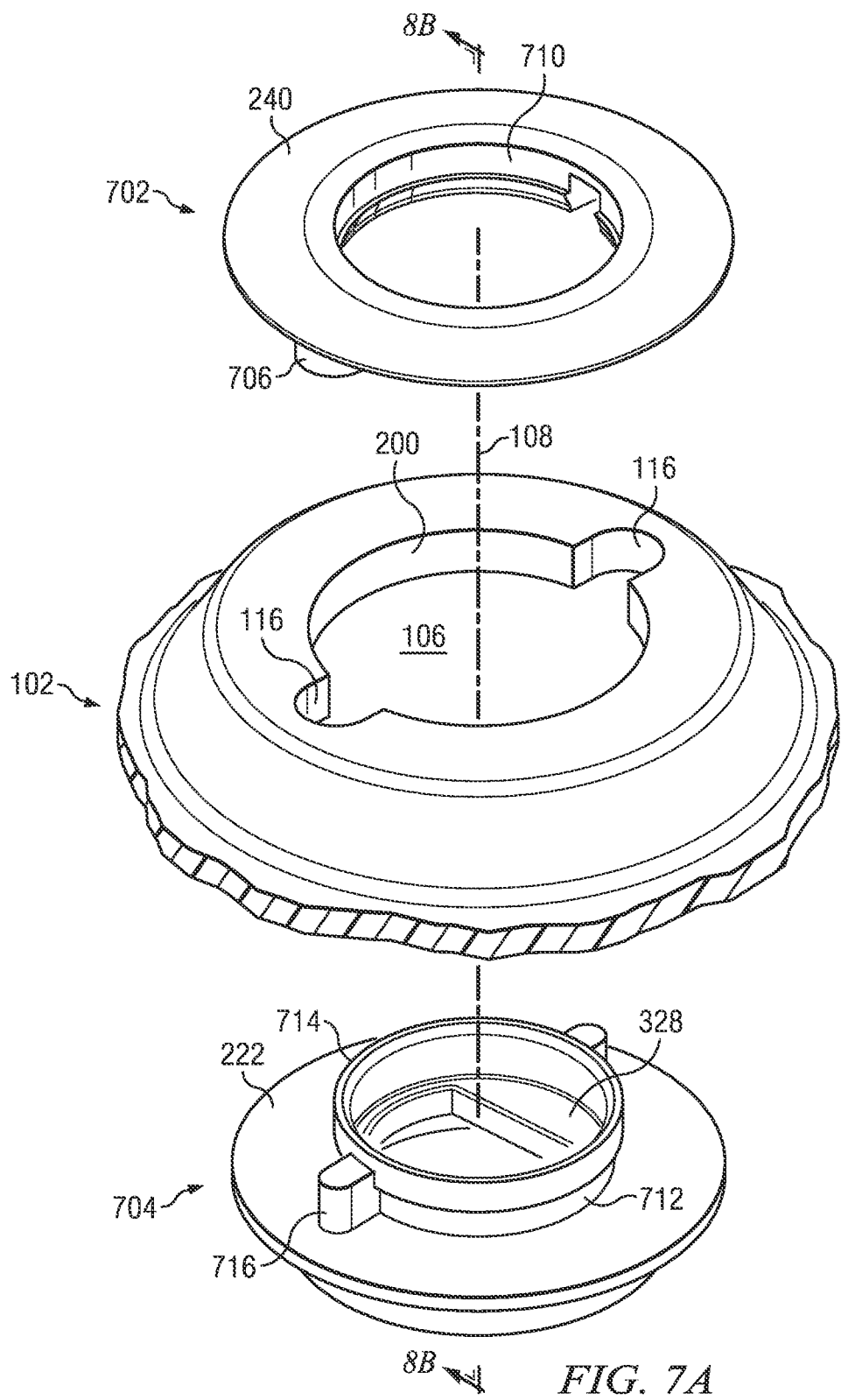
FIG. 7A is an exploded top isometric view showing a floor cover, a top grommet portion, and a bottom grommet portion according to a third embodiment.
Figure 7B:
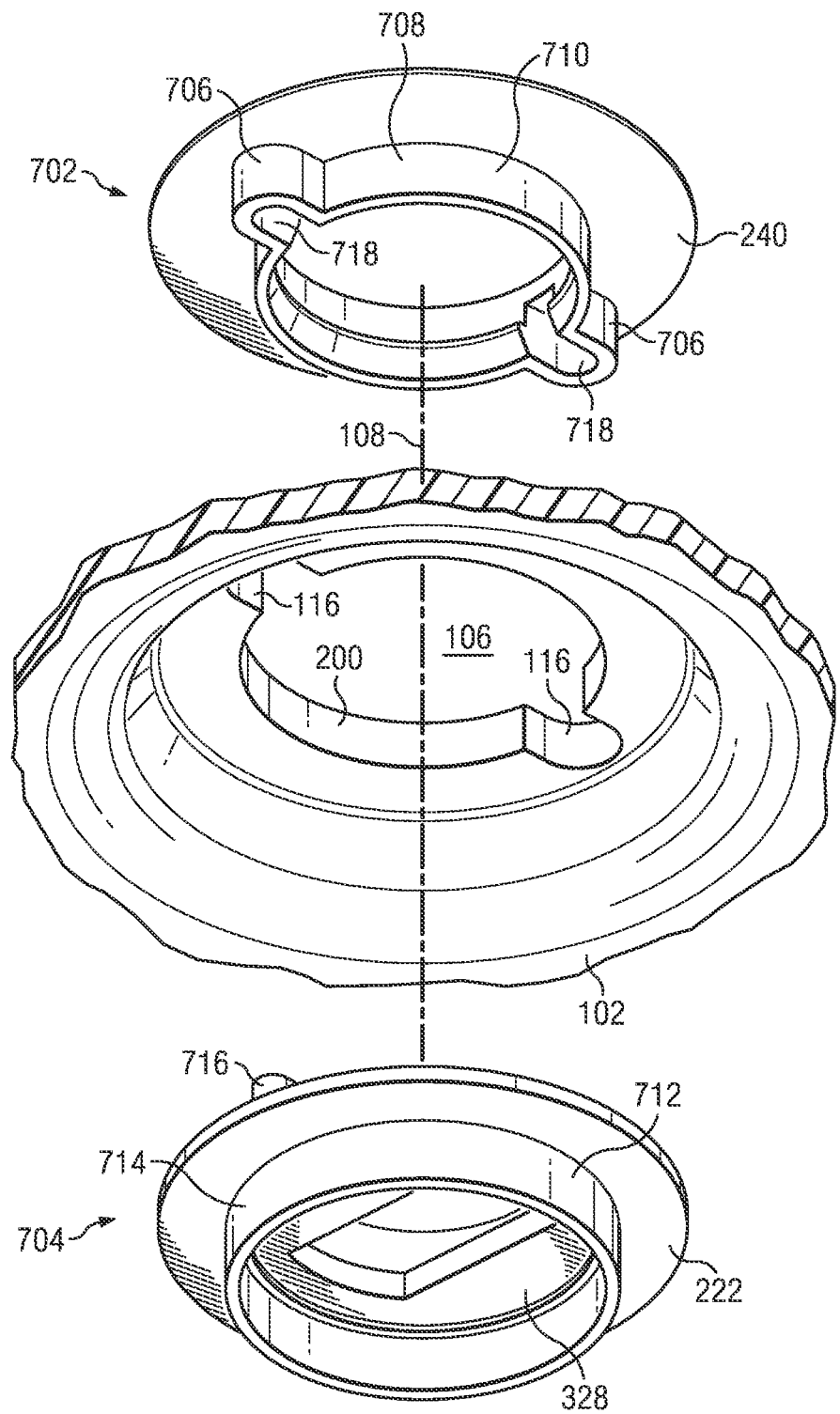
FIG. 7B is an exploded bottom isometric view of the top and bottom grommet portions and the floor cover shown in FIG. 7A.
Figure 8A:
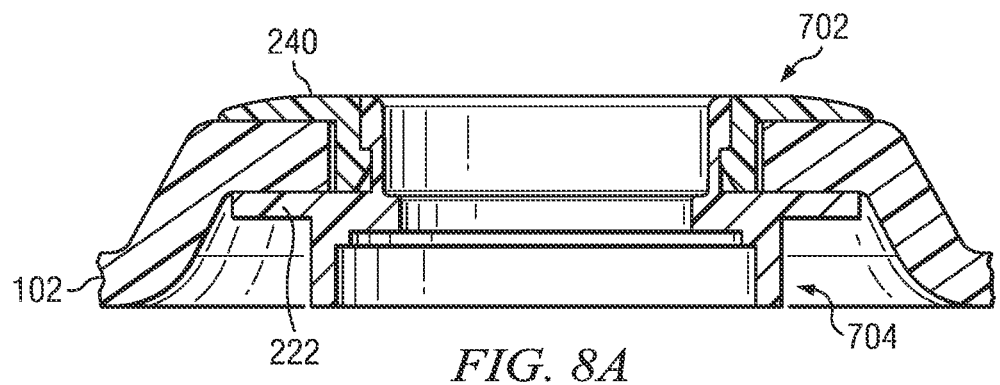
FIG. 8A is a side sectional view of the embodiment shown in FIGS. 7A and 7B, normal to the receptacles and protrusions appearing therein, and shown in an assembled condition.
Figure 8B:
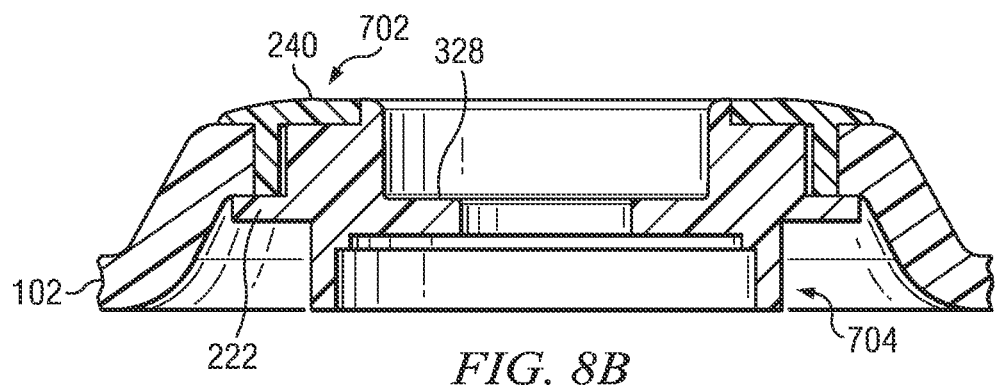
FIG. 8B is a side sectional view taken substantially along line 8B-8B of FIG. 7A.

As shown in FIG. 6, the floor cover 102 can be either a floor tray 602, which conforms to the shape of the vehicle foot well (not shown), or a floor mat 604, which generally conforms to and is coextensive with the floor and firewall of the foot well (also not shown). In the illustrated embodiment, the tray 602 is relatively thin and rigid, while the mat 604 is thicker and more yieldable, but the reverse could be true.

Figure 5:
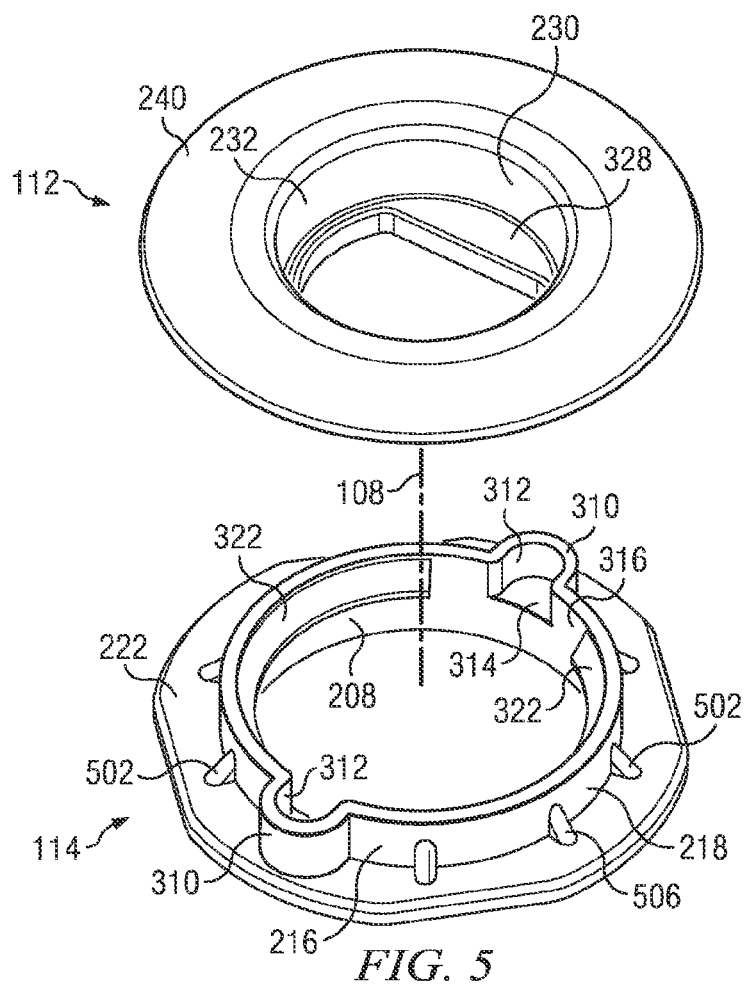
FIG. 5 is an exploded top isometric view of a grommet having a plurality of gussets.

As shown in FIGS. 5 and 6, the bottom grommet portion 114 may also have one or more angularly spaced-apart (if two or more) chamfered gussets 502 that are formed to join the outer surface 218 of the female tubular body 216 to the bottom floor cover retention flange 222. Each gusset 502 has an outwardly and downwardly sloping edge or stop surface 506. The horizontal distance 607 of the stop surface 506 from the outer surface 218 of the female tubular body increases as a function of depth and the surface's proximity to bottom retention flange 222. A right cross sectional area (normal to axis 108) of the gusset 502 increases as a function of its axial proximity to flange 222.

In this embodiment, when the top grommet portion 112 is mated with the bottom grommet portion 114 (see FIG. 6), the gussets 502 create a region 606 of variable compression that is capable of affixing the top and bottom grommet portions 112, 114 in order to tightly clad floor covers of different thicknesses. For example, FIG. 6 shows that the top and bottom grommet portions 112, 114 are capable of accommodating, clamping or affixing the grommet 110 to either a floor cover 602 with a thickness $T_1$ or a floor cover 604 with a greater thickness $T_2$ within the region of variable compression 606. More of gusset 502 is used to compress the thicker floor cover 604, and less of it will compress thinner floor cover 602. Gusset 502 will tend to prop thinner floor cover 602 against the lower surface of upper retention flange 240, removing any perceptible axial gap between that surface and the lower surface 300 of the floor cover 602.

The gussets 502 each have a peak 608, a bottom end 610, and a stop surface 506 that supports and as necessary props up the floor cover 602, 604. The stop surface 506 preferably bites into the floor cover 602, 604, providing compression between the gusset 502 and the top floor cover retention flange 240. The stop surface 506 is shown to be linear in FIGS. 4 and 6, but it may take a variety of configurations, such as a curved surface or even a series of stepped ledges. During grommet assembly, the stop surfaces 506 help center the floor cover 102 along the axis 108 and the peak 608 of the stop surface can be spaced from the top end 313 of the female tubular body 216 as shown in FIG. 6. The displacement of peak 608 from the top end 313 (or, alternatively, from the lower surface of the retention flange 240) can be selected to accommodate the thinnest floor cover 602 for which the grommet 110 will be provided.

Figure 9:
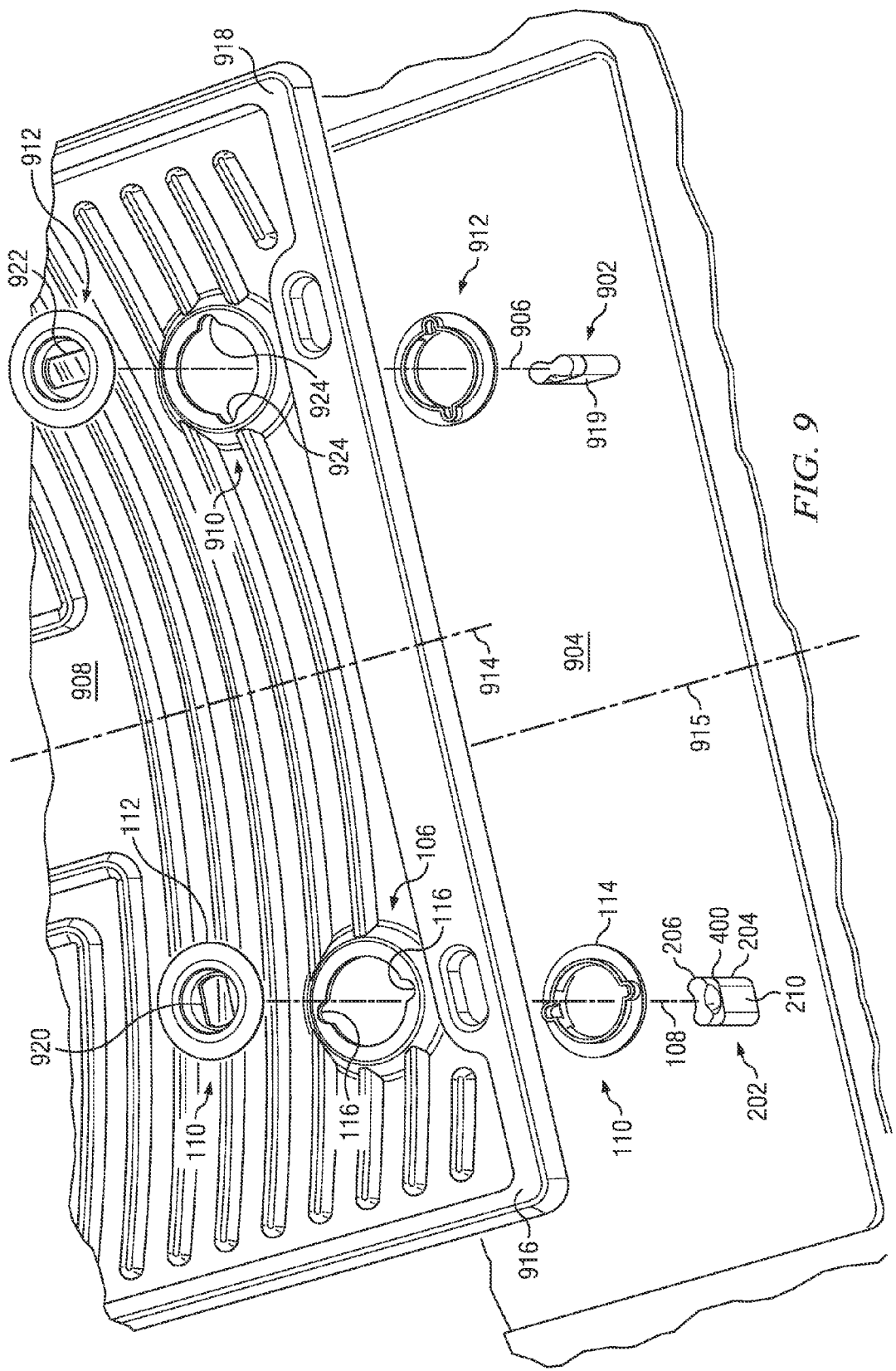
FIG. 9 is an exploded isometric view of a vehicle floor cover affixation system in which the studs and grommet stud holes have intentionally different spatial orientations.

In one embodiment and as illustrated in FIG. 9, a floor cover retention system employs at least two studs 202, 902 which can be permanently affixed to a floor of a vehicle foot well indicated generally at 904. Upstanding stud 202 is disposed on an axis 108 which is laterally spaced apart (preferably in a transverse direction) from an axis 906 on which is disposed the stud 902. A floor cover 908, which may be a mat or a tray, has first and second stud holes 106, 910 and respective first and second grommets 110, 912, which conveniently can be of the two-piece type, representative examples of which are described above. As installed in the vehicle, the first grommet 110, first floor cover hole 106 and first stud 202 all are disposed on a first, outboard axis 108. The second grommet 912, the second floor cover hole 910 and the second stud 902 are all disposed on a second, inboard axis 906. The axes 108, 906 are substantially equidistant from a floor cover center line 914, which may not define the center of the floor cover 908, but which substantially bisects the distance between axes 108 and 906. A fore and aft foot well center line 915 bisects the transverse distance between stud 202 and stud 902. When the floor cover is installed in the vehicle, center line 915 will be substantially congruent with center line 914. Axis 108 may be near an aft and outboard corner 916 of the floor cover 908; axis 906 may be near an aft and inboard corner 918 of the floor cover 908. Because the foot wells of conventional vehicles are often not bilaterally symmetrical around their fore and aft center lines, the mats and trays designed to fit into them will often not be, either, and therefore the positioning of the studs 202, 902 and the grommets 110, 912 may have considerable deviation away from bilateral symmetry; one stud may be more forward, or farther away from, the margin of mat/tray 908, than the other.

Studs 202 and 902 have respective vertical sidewalls 210, 919 which are non-circular in right cross-section. As shown, the studs 202, 902 may be mathematically cylindrical or prismatic, although alternatively their lateral thickness could vary as a function of height along the axis, such that they would "snap" past any receiving grommet stud hole (described below) rather than be simply slidably received into it. In the illustrated embodiment, first stud 202 comprises a post 204 which is permanently affixed to the vehicle foot well floor or carpet 904, and a locking and rotating member 206 which is pivotally attached to a top end 400 of the post 204. The locking and rotating member 206 may be rotated between a first position in which a sidewall 212 thereof is in alignment with a sidewall 210 of the post 204, and a second position (not shown; see FIG. 4) in which sidewall 212 is intentionally out of alignment with the sidewall 210 of the post 204. Stud 902 can have a similar construction. Alternatively the studs 202, 902 may have no such rotating or locking members and may simply be solid pieces.

Grommet 110 has a stud hole 920 into which stud 202 may be slidably received. The floor cover hole 106 formed in floor cover 908 has at least one (in the illustrated embodiment, two) orienting shapes 116 which cooperate with orienting features on grommet 110 (as examples, see features 310 (FIG. 2), 706 (FIG. 7B)) to prevent rotation of the grommet 110 with respect to the floor cover 908. In this way, the stud hole 920 will have a predetermined orientation with respect to the floor cover 908 and the stud 202. Grommet 912 has a stud hole 922 into which stud 902 may be slidably received. The inboard floor cover hole 910 has at least one (in the illustrated embodiment, two) orienting shapes 924 which cooperate with orienting features on grommet 912 (see examples listed above) to prevent rotation of the grommet 912 with respect to the floor cover 908. Stud hole 922, which is also noncircular, will therefore have a predetermined orientation with respect to the floor cover 908 and the stud 902.

In this embodiment, studs 202 and 902 are not mirror images of each other around the center line 915. In like manner, stud holes 920 and 922 are not mirror images of each other around the center line 914. In the illustrated embodiment, the studs 202 and 902, and the grommets 110, 912 into which they fit, are respectively identical in shape, but their orientation is intentionally different. For example, the stud 202, which can be oblong as shown, has a greater lateral dimension in the transverse or side-to-side direction, while stud 902 has its greater lateral dimension in the longitudinal or fore-and-aft direction. This causes the grommet 110 to successfully receive only stud 202, while grommet 912 can receive only stud 902. The studs 202, 902 should be so sized and shaped that neither of them will fit into both grommets 110, 912 but only into one of them.

Suppose that a consumer attempts to install mat or tray 908 upside down, such that the position of grommets 110, 912 is reversed. The consumer will quickly discover that grommet 912 does not admit the stud 202, and that grommet 110 does not admit the stud 902. The consumer is thus forced to flip over the floor cover 908 such that it is right-side up, and then will find that the floor cover grommets 110, 912 fit onto the studs 202, 902 in the way the manufacturer intended.

While studs 202 and 902, and grommets 110 and 912, conveniently can be identical to each other in structure, thereby minimizing manufacturing costs, it is also possible to provide a stud 202 whose right cross section is very different from the right cross section of stud 902. For example, stud 202 can be triangular in cross section, while stud 902 can be star-shaped, and their respective stud holes 920, 922 can correspondingly conform. Any noncircular shapes can be used, with the following limitations: (a) the shapes cannot be mirror images of each other around the center lines 914, 915, and (b) at least one of the studs 202, 902 will be able to be received into only one of the grommets 110, 912 rather than both of them. Preferably the studs and grommets 202, 902; 110, 912 are mutually exclusive: grommet 110 will only receive stud 202, and grommet 912 will only receive stud 902.

In summary, a vehicle floor cover/grommet orientation system has been illustrated and described, whereby two-piece grommets may be assembled to floor cover grommet holes in only a specific orientation. This assures that as assembled, a noncircular stud hole of the grommet will correctly receive the vehicle floor cover stud that it was intended to fit over. The noncircular cross sections of the studs and stud holes are also used to provide a vehicle floor cover in which a first stud hole is different from and not a mirror image of a second stud hole, mitigating the chance that the user will incorrectly install the floor cover in the vehicle foot well. While embodiments of the present invention have been described and illustrated in the appended drawings, the present invention is not limited thereto but only by the scope and spirit of the appended claims.

I claim:

1. A vehicle floor cover comprising:
   a floor cover body having an upper surface, a lower surface, and a hole formed from the lower surface to the upper surface around an axis;
   a bottom grommet portion having a bottom tubular body formed around the axis, the bottom tubular body having an inner surface and an outer surface, a bottom floor cover retention flange extending radially outwardly from the outer surface of the bottom tubular body, at least a portion of the bottom tubular body upwardly extending from the bottom floor cover retention flange;
   a top grommet portion having a top tubular body formed around the axis, the top tubular body having an inner surface and an outer surface, a top floor cover retention flange extending radially outwardly from the outer surface of the top tubular body, at least a portion of the top tubular body downwardly extending from the top floor cover retention flange;
   a preselected one of the top and bottom tubular bodies being female and the other of the top and bottom tubular bodies being male, such that the male tubular body fits inside of the female tubular body, an inner surface of the female tubular body being generally cylindrical and having a length, at least one receptacle formed in the inner surface of the female tubular body to extend radially outwardly therefrom, the receptacle disposed adjacent to an upper axial end of the female tubular body, the receptacle having an axial depth as measured from the free end which is less than the length of the inner surface of the female tubular body;
   an outer surface of the male tubular body being generally cylindrical, at least one protrusion radially outwardly extending from the outer surface of the male tubular body and adapted to be received in said receptacle of the female tubular body, the protrusion of the male tubular body cooperating with the receptacle of the female tubular body to prevent rotation of the male tubular body relative to the female tubular body around the axis, the axial depth of the receptacle being less than the length of the inner surface of the female tubular body, thereby preventing the assembly of the female tubular body in an upside down condition to the male tubular body;
   a plurality of angularly spaced-apart chamfered gussets each formed to join the outer surface of the bottom tubular body to the bottom floor cover retention flange, a right cross sectional area of each gusset increasing as a function of its axial proximity to the bottom floor cover retention flange.

2. The vehicle floor cover of claim 1, wherein the bottom tubular body is female.

3. The vehicle floor cover of claim 1, wherein the vehicle floor cover is selected from the group consisting of floor mats and floor trays.

4. The vehicle floor cover of claim 1, wherein the sidewall of the hole of the floor cover is generally circularly cylindrical, a plurality of angularly spaced apart grooves extending radially outwardly from the sidewall of the hole of the floor cover, an outer surface of the female tubular body including a plurality of radially outwardly extending protrusions each adapted to be received in a respective one of the grooves.

5. The vehicle floor cover of claim 4, wherein the receptacle formed in the inner surface of the female tubular body is one of a plurality of receptacles angularly spaced from each other, the protrusions radially outwardly extending from the outer surface of the female tubular body being in angular alignment with the receptacles formed into the inner surface of the female tubular body.

6. The vehicle floor cover of claim 1, wherein the top floor cover retention flange extends around the entire circumference of the top tubular body and the bottom floor cover retention flange extends around the entire circumference of the bottom tubular body.

7. The vehicle floor cover of claim 1, wherein each gusset includes a peak adjoining the outer surface of the female tubular body, a bottom end adjoining the bottom floor cover retention flange, and a linear stop surface extending between the peak and the last said bottom end.

8. The vehicle floor cover of claim 1, wherein each gusset includes a peak adjoining the outer surface of the female tubular body, the peak being spaced from a top end of the female tubular body.

9. The vehicle floor cover of claim 1, wherein the female tubular body includes a plurality of angularly spaced-apart receptacles each extending radially outwardly from the generally cylindrical inner surface of the female tubular body, the male tubular body having a plurality of angularly spaced-apart protrusions each adapted to be received in a respective one of the receptacles.

10. The vehicle floor cover of claim 1, and further comprising a first latch formed into the inner surface of the female tubular body and a second latch formed into the outer surface of the male tubular body, the first and second latches coacting to produce a snap fit when the male tubular body is pressed into the female tubular body.

11. The vehicle floor cover of claim 1, wherein the inner surface of the male tubular body has a lower portion, an upper portion, and at least one land between the upper and lower portions and extending radially inwardly from the inner surface of the male tubular body.

12. The vehicle floor cover of claim 1, wherein the male tubular body is the top grommet portion.

* * * * *